(12) United States Patent
Wendt et al.

(10) Patent No.: US 9,357,497 B2
(45) Date of Patent: May 31, 2016

(54) CONTROLLING THE POWER CONSUMPTION OF A RECEIVING UNIT

(75) Inventors: Matthias Wendt, Wuerselen (DE); Bozena Erdmann, Aachen (DE); Carsten Deppe, Aachen (DE); Georg Sauerlaender, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 269 days.

(21) Appl. No.: 12/865,438

(22) PCT Filed: Feb. 2, 2009

(86) PCT No.: PCT/IB2009/050403
§ 371 (c)(1),
(2), (4) Date: Jul. 30, 2010

(87) PCT Pub. No.: WO2009/098628
PCT Pub. Date: Aug. 13, 2009

(65) Prior Publication Data
US 2010/0325456 A1    Dec. 23, 2010

(30) Foreign Application Priority Data

Feb. 5, 2008   (EP) ..................................... 08101293

(51) Int. Cl.
*G06F 1/32*     (2006.01)
*H04W 52/02*    (2009.01)

(52) U.S. Cl.
CPC .............. *H04W 52/028* (2013.01); *Y02B 60/50* (2013.01)

(58) Field of Classification Search
CPC .............................. G06F 1/3203; G06F 1/3287
USPC ........................................................... 713/320
See application file for complete search history.

(56) References Cited

U.S. PATENT DOCUMENTS

| | | | | |
|---|---|---|---|---|
| 3,987,398 A | * | 10/1976 | Fung ............................. | 725/127 |
| 4,734,771 A | * | 3/1988 | Lendaro et al. ............... | 348/730 |
| 4,737,851 A | * | 4/1988 | Shanley et al. ............... | 348/730 |
| 4,955,038 A | * | 9/1990 | Lee et al. ...................... | 375/256 |

(Continued)

FOREIGN PATENT DOCUMENTS

| | | |
|---|---|---|
| EP | 0426452 A2 | 5/1991 |
| GB | 2271691 A | 4/1994 |

(Continued)

*Primary Examiner* — Paul R Myers

(57) ABSTRACT

An average power consumption of receiving units (3,5,7) for controlling apparatuses (4,6,8) in response to operation control signals from transmitting units (2) may be reduced by introducing devices (1,21) for controlling the power consumption of the receiving units (3,5,7) in response to detections of states of the apparatuses (4,6,8). The devices (1) may comprise controllers (30) for controlling the power consumption in a wireless, non-wireless, physical and/or logical manner. The devices (1) may comprise monitors (33) for monitoring power consumption, currents and/or voltages at the receiving units (3,5,7) and/or the apparatuses (4,6,8). The devices (1) may comprise receivers (40), detectors (41), converters (42) and transmitters (43) for receiving the operation control signals, detecting the states of the apparatuses (4,6,8), converting the operation control signals into converted signals, and transmitting the operation control signals or the converted signals to the receiving units (3,5,7) for controlling the power consumption of the receiving units (3,5,7) via the transmitted signals, wherein the transmitted signals correspond to power control signals.

20 Claims, 5 Drawing Sheets

1 – Device; 2 – Transmitting Unit; 3, 5, 7 – Receiving Unit; 4, 6, 8 – Apparatus; 9 – Detector; 100, 101, 102 – Link; 103, 105, 107 – Link; 104, 106, 108 – Link; 110, 111, 112 - Detection Link; 109 – Information Link;

(56) References Cited

U.S. PATENT DOCUMENTS

| | | | | |
|---|---|---|---|---|
| 5,081,402 | A * | 1/1992 | Koleda | 318/16 |
| 5,448,756 | A * | 9/1995 | DeLuca et al. | 340/7.33 |
| 5,606,728 | A * | 2/1997 | Keba et al. | 340/7.35 |
| 5,760,558 | A * | 6/1998 | Popat | 318/480 |
| 5,794,137 | A * | 8/1998 | Harte | 455/343.4 |
| 6,211,626 | B1 * | 4/2001 | Lys et al. | 315/291 |
| 6,211,627 | B1 * | 4/2001 | Callahan | 315/294 |
| 6,230,277 | B1 * | 5/2001 | Nakaoka et al. | 713/320 |
| 6,360,085 | B1 * | 3/2002 | Walley | 455/226.2 |
| 6,784,801 | B2 * | 8/2004 | Watanabe et al. | 340/679 |
| 6,943,667 | B1 * | 9/2005 | Kammer et al. | 340/286.01 |
| 6,990,362 | B2 * | 1/2006 | Simpson et al. | 455/574 |
| 6,993,393 | B2 * | 1/2006 | Von Arx et al. | 607/60 |
| 7,027,796 | B1 * | 4/2006 | Linsky et al. | 455/343.1 |
| 7,058,739 | B2 * | 6/2006 | Wu | 710/106 |
| 7,058,833 | B1 * | 6/2006 | Bremer et al. | 713/324 |
| 7,064,498 | B2 * | 6/2006 | Dowling et al. | 315/291 |
| 7,149,906 | B2 * | 12/2006 | Sakai | 713/300 |
| 7,319,867 | B2 * | 1/2008 | Li | 455/420 |
| 7,421,257 | B1 * | 9/2008 | Elliott | 455/127.5 |
| 7,504,952 | B2 * | 3/2009 | Kaplan et al. | 340/572.7 |
| 7,506,188 | B2 * | 3/2009 | Krantz et al. | 713/320 |
| 7,546,090 | B2 * | 6/2009 | Sayers | 455/78 |
| 7,564,810 | B2 | 7/2009 | Hernandez | |
| 7,590,432 | B2 * | 9/2009 | Behzad et al. | 455/574 |
| 7,860,527 | B2 * | 12/2010 | Ngai et al. | 455/552.1 |
| 7,881,755 | B1 * | 2/2011 | Mishra et al. | 455/574 |
| 7,929,985 | B2 * | 4/2011 | Khayrallah et al. | 455/550.1 |
| 8,024,584 | B2 * | 9/2011 | Birmingham | 713/300 |
| 2002/0141662 | A1 | 10/2002 | Chiba et al. | |
| 2005/0130713 | A1 * | 6/2005 | Simpson et al. | 455/574 |
| 2006/0154598 | A1 | 7/2006 | Rudland et al. | |
| 2006/0215345 | A1 | 9/2006 | Huizenga | |
| 2006/0238136 | A1 * | 10/2006 | Johnson, III et al. | 315/185 R |
| 2007/0238437 | A1 * | 10/2007 | Jaakkola | 455/343.1 |

FOREIGN PATENT DOCUMENTS

| | | |
|---|---|---|
| GB | 2347300 A | 8/2000 |
| GB | 2379365 A | 3/2003 |
| JP | 2006510181 A | 3/2006 |
| JP | 2007104174 A | 4/2007 |
| JP | 2007515902 A | 6/2007 |
| WO | 2006129227 A2 | 12/2006 |

\* cited by examiner

1 – Device; 2 – Transmitting Unit; 3, 5, 7 – Receiving Unit; 4, 6, 8 – Apparatus; 9 – Detector; 100, 101, 102 – Link; 103, 105, 107 – Link; 104, 106, 108 – Link; 110, 111, 112 - Detection Link; 109 – Information Link;

1, 11, 21 – Device; 3, 5, 7, 23, 25, 27 – Receiving Unit;
4, 6, 8, 24, 26, 28 – Apparatus; 103, 105, 107, 203, 205,
207 – Link; 109, 209 – Information Link; 113, 213, 313 -
Link 1 – Device; 30 – Controller; 31, 32, 35 – Interface;
33 – Monitor; 34 – Processor; 103, 105, 107 – Link;
109 – Information Link; 113 – Link 1 – Device; 30 – Controller; 31, 32, 35, 37 – Interface;
33 – Monitor; 34 – Processor; 38 – Supply Line; 103,
105, 107 – Link; 109 – Information Link; 113 – Link 1 – Device; 30 – Controller; 35 – Interface; 40 – Receiver;
41 – Detector; 42 – Converter; 43 – Transmitter; 44 – Memory;
100, 101, 102 – Link; 103, 105, 107 – Link 11 – Device; 50 – Controller; 51, 52, 55 – Interface;
53 – Monitor; 54 – Processor; 113, 213, 313 – Link;
309 – Information Link 11 – Device; 50 – Controller; 51, 52, 55, 57 – Interface;
53 – Monitor; 54 – Processor; 56, 58 – Supply Line;
113, 213, 313 – Link; 309 – Information Link 50 – Controller; 55 – Interface; 60 – Receiver;
61 – Detector; 62 – Converter; 63 – Transmitter;
64 – Memory; 100, 101, 102 – Link; 113, 213, 313 – Link

CONTROLLING THE POWER CONSUMPTION OF A RECEIVING UNIT

FIELD OF THE INVENTION

The invention relates to a device for controlling the power consumption of a receiving unit. The invention also relates to a further device, a system and a method.

Examples of such a receiving unit are units for receiving wireless or non-wireless operation control signals for controlling apparatuses, such as lamps and other appliances and products, in response to reception of these wireless or non-wireless operation control signals.

BACKGROUND OF THE INVENTION

US 2006/0154598 discloses a method of configuring and operating a radio system employing the ZigBee radio standard. The method enables a group of radio devices which are logically linked to another radio device to respond with low latency to a message. The method comprises a group identifier being generated and issued to logically linked devices, details of which are provided in a pre-installed binding table. In operation, a radio message from a device which is logically linked to another one is received by a device coordinator which then broadcasts the message with the generated group identifier. Only those devices that have previously received a matching group identifier respond to the broadcast message. Since broadcasts are not acknowledged, a rapid system response is achieved.

OBJECT AND SUMMARY OF THE INVENTION

It is an object of the invention to provide a device for controlling the power consumption of a receiving unit.

Further objects are to provide a further device, a system and a method.

In accordance with a first aspect, a device is provided for controlling the power consumption of a receiving unit which is arranged to control an apparatus, the device comprising a controller which, in response to a detection of a state of the apparatus, controls the power consumption of the receiving unit so as to reduce its average power consumption.

The state may be, for example, a current state of the apparatus, indicating, for example, that the apparatus is switched on or off. The controller controls the power consumption of the receiving unit in dependence upon the detected state of this apparatus so as to reduce an average power consumption of the receiving unit. For example, when the apparatus is switched on (off) and when the controller knows that the apparatus does not need to be switched off (on) for a predefined time interval, the receiving unit can be switched off for this predefined time interval. This reduces the average power consumption of the receiving unit.

Instead of the two states, the apparatus may have three or more states. States other than the current states and the on/off states are not to be excluded. Instead of information about the predefined time interval, other information may be used to reduce the average power consumption of the receiving unit.

In one embodiment, the device is arranged to control the power consumption of a further receiving unit which is arranged to control a further apparatus, while, in response to a detection of a state of the further apparatus, the controller is arranged to control the power consumption of the further receiving unit so as to reduce its average power consumption. The overall efficiency is further increased if one device controls the power consumption of two or more receiving units, and per device more average power consumption can be reduced.

In a further embodiment, the receiving unit forms part of a lamp driver, and/or the apparatus comprises a lamp. A detector for detecting a state of the apparatus may comprise, or may be coupled to, for example, a light-dependent resistor or a photo diode or a solar cell and may detect that the lamp is, for example, switched on or off or is in a dimming mode. Such a detector may form part of the device.

In another embodiment, the controller communicates via a wireless or a non-wireless interface so as to control the power consumption of the receiving unit in a wireless or non-wireless manner, and/or the controller communicates via a physical and/or a logical interface so as to control the power consumption of the receiving unit physically and/or logically. The controller may control, for example, the power consumption of the receiving unit in a wireless manner via a wireless power control signal, in which case the receiving unit should comprise means for receiving such a wireless power control signal. The wireless power control signal and the wireless operation control signal may be defined through either the same or different standards. The controller may control, for example, the power consumption of the receiving unit in a non-wireless manner via a non-wireless power control signal, in which case the receiving unit should comprise means for receiving such a non-wireless power control signal. The non-wireless power control signal and the non-wireless operation control signal may be defined through either the same or different standards. Both the power control signal and the operation control signal may be wireless or non-wireless signals, or one of them may be a wireless signal, with the other one being a non-wireless signal. The controller may comprise, for example, a physical interface for controlling the power consumption of the receiving unit physically, for example, by controlling a current flowing through and/or a voltage supplied to the receiving unit. The controller may comprise, for example, a logical interface for controlling the power consumption of the receiving unit logically, for example, by sending a power control command to the receiving unit.

In yet a further embodiment, the device further comprises a monitor for monitoring the power consumption of, and/or a current flowing through, and/or a voltage supplied to the receiving unit and/or the apparatus. In this way, the device may get current information about the receiving unit and/or the apparatus.

In another embodiment, the receiving unit is a wireless or a non-wireless receiving unit for controlling the apparatus in response to a reception of a wireless or non-wireless operation control signal from a transmitting unit. The receiving unit may control the apparatus in accordance with any wireless or any non-wireless standard.

In yet another embodiment, the device further comprises a receiver for receiving the operation control signal. In this way, the device may listen to the operation control signal and may get future information about the receiving unit and/or the apparatus.

In a further embodiment, the device also comprises a detector for detecting the state of the apparatus in response to a reception of the operation control signal. In this case, the state of the apparatus is a future state that should be introduced soon.

In a further embodiment, the device also comprises a memory for storing the operation control signal, and/or a transmitter for transmitting and/or re-transmitting the operation control signal to the receiving unit. According to this option, the device forwards the operation control signal to the receiving unit. This may be done immediately after reception, or after expiration or termination of a time interval, or after having ensured that the receiving unit is powered and/or capable of receiving this operation control signal. The transmission of the operation control signal may comprise a single transmission, a single re-transmission and/or repeated (re-) transmissions, etc.

In yet a further embodiment, the device comprises a converter for converting the operation control signal into a converted signal, and/or a memory for storing the converted signal, and/or a transmitter for transmitting and/or re-transmitting the converted signal to the receiving unit. According to this option, the device converts the operation control signal and then transmits the converted signal to the receiving unit. This may be done immediately after conversion, or after expiration or termination of a time interval, or after having ensured that the receiving unit is powered and/or capable of receiving this converted signal. The transmission of the converted signal may comprise a single transmission, a single re-transmission and/or repeated (re-)transmissions, etc.

In another embodiment, the controller communicates via the transmitter for controlling the power consumption of the receiving unit via the converted signal. In this highly efficient situation, the converted signal corresponds to the power control signal, and the controller controls the power consumption of the receiving unit via a transmission of the converted signal to the receiving unit.

In yet another embodiment, the device further comprises a processor which, in response to an analysis of traffic exchanged via the receiving unit, and/or an analysis of the power consumption, and/or a current flowing through, and/or a voltage supplied to the receiving unit and/or the apparatus, generates statistics and/or a message, and/or adapts the behavior of the device. The device may be coupled to, or further comprise, a memory for storing such statistics, messages and/or behavior.

In accordance with a second aspect, a further device is provided for controlling the power consumption of the device as defined hereinbefore, the further device comprising a further controller which, in response to a detection of a state of the device and/or the receiving unit and/or the apparatus, controls the power consumption of the device so as to reduce its average power consumption. In this way, a hierarchical system is created. The apparatus and the receiving unit can be found at the lowest level, the device can be found at a middle level, and the further device can be found at the highest level. Alternatively, the apparatus can be found at the lowest level, the receiving unit can be found at a lower middle level, the device can be found at a higher middle level, and the further device can be found at the highest level. Further and other levels are not to be excluded.

In accordance with a third aspect, a system is provided, comprising at least one device as defined hereinbefore, the system further comprising at least one further device as defined hereinbefore and/or at least one receiving unit and/or at least one apparatus. Such a system may be, for example, a building comprising a further device per floor for floor control and comprising, per floor, a device per room for room control.

In accordance with a fourth aspect, a method is provided for controlling the power consumption of a receiving unit which is arranged to control an apparatus, the method comprising a step of controlling, in response to a detection of a state of the apparatus, the power consumption of the receiving unit so as to reduce its average power consumption.

The invention may be based on the recognition that (more) hierarchy should be introduced. A basic idea might be that a device should be provided with a controller which, in response to a detection of a state of an apparatus, controls the power consumption of a receiving unit that controls the apparatus so as to reduce an average power consumption of the receiving unit.

The device according to the invention has the advantage that the energy consumption can be reduced.

These and other aspects of the invention are apparent from and will be elucidated with reference to the embodiments described hereinafter.

DESCRIPTION OF EMBODIMENTS

Figure 1:
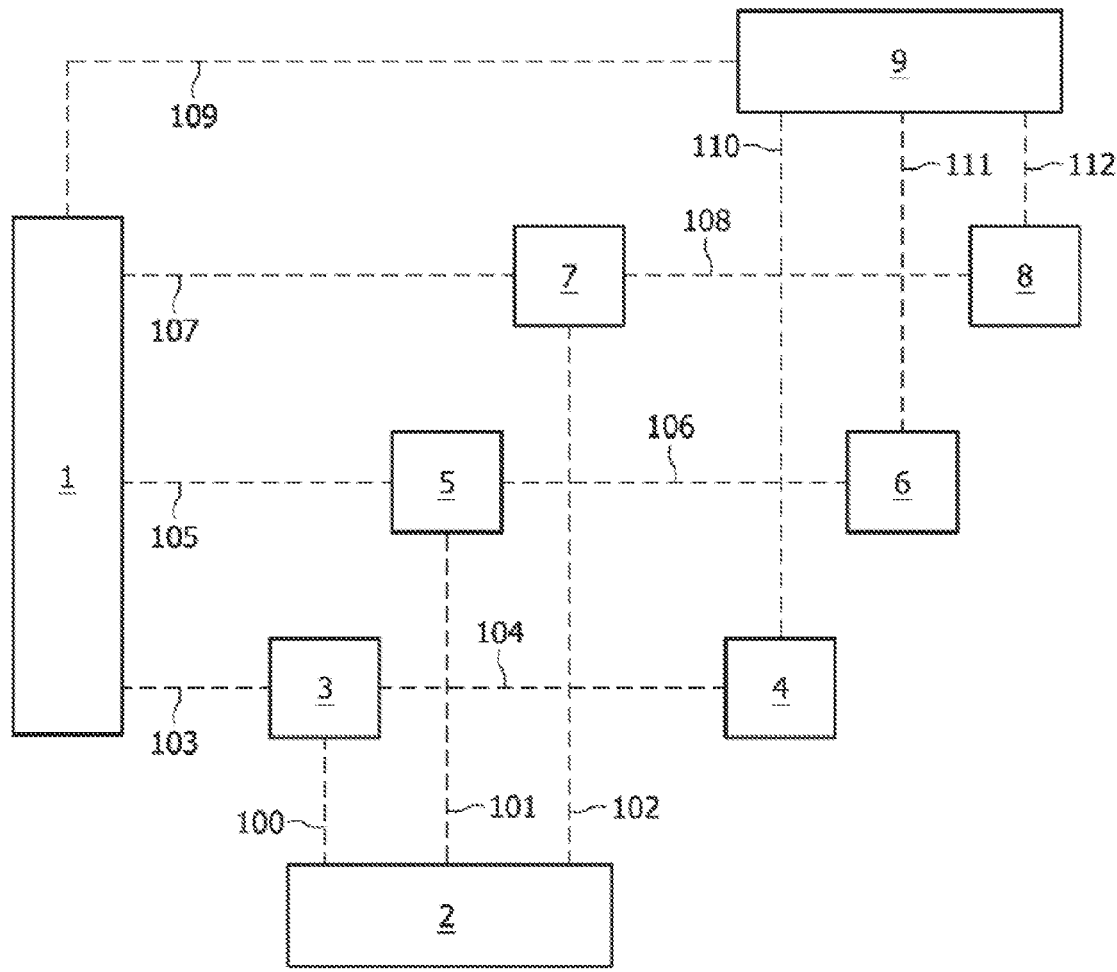
FIG. 1 shows a device controlling three receiving units.

FIG. 1 shows a device 1 for controlling the power consumption of a first (second, third) receiving unit 3 (5, 7) via a wireless or a non-wireless link 103 (105, 107). The first (second, third) receiving unit 3 (5, 7) controls a first (second, third) apparatus 4 (6, 8) via a usual non-wireless or otherwise wireless link 104 (106, 108). A transmitting unit 2 controls the first (second, third) receiving unit 3 (5, 7) via a usual wireless or otherwise non-wireless link 100 (101, 102) by sending an operation control signal via this link 100 (101, 102). A detector 9 detects a state of the first (second, third) apparatus 4 (6, 8) via a detection link 110 (111, 112) and informs the device 1 via an information link 109.

The apparatus 4 (6, 8) comprises, for example, a lamp, an appliance or another product that is remotely controlled via a combination of the transmitting unit 2 and the receiving unit 3 (5, 7). The device 1 controls the power consumption of the receiving unit 3 (5, 7) in dependence upon a state of the apparatus 4 (6, 8). This state may be an 'on' state, an 'off' state, a dimming state or any other kind of state. The detector 9 may comprise, for example, a light-dependent resistor, a photo diode, or a solar cell, or it may be arranged to detect the power consumption of, and/or a current flowing through, and/or a voltage supplied to the receiving unit 3 (5, 7) and/or the apparatus 4 (6, 8).

When, for example, the apparatus 4 (6, 8) is switched on (off), and when the device 1 knows that the apparatus 4 (6, 8) does not need to be switched off (on) for a predefined time interval, the receiving unit 3 (5, 7) can be switched off for this predefined time interval. This reduces the average power consumption of the receiving unit 3 (5, 7). An average power consumption is a power consumption per time interval, such as an hour, a day, a week, a month, or a year, without exclusion of other time intervals.

Figure 2:
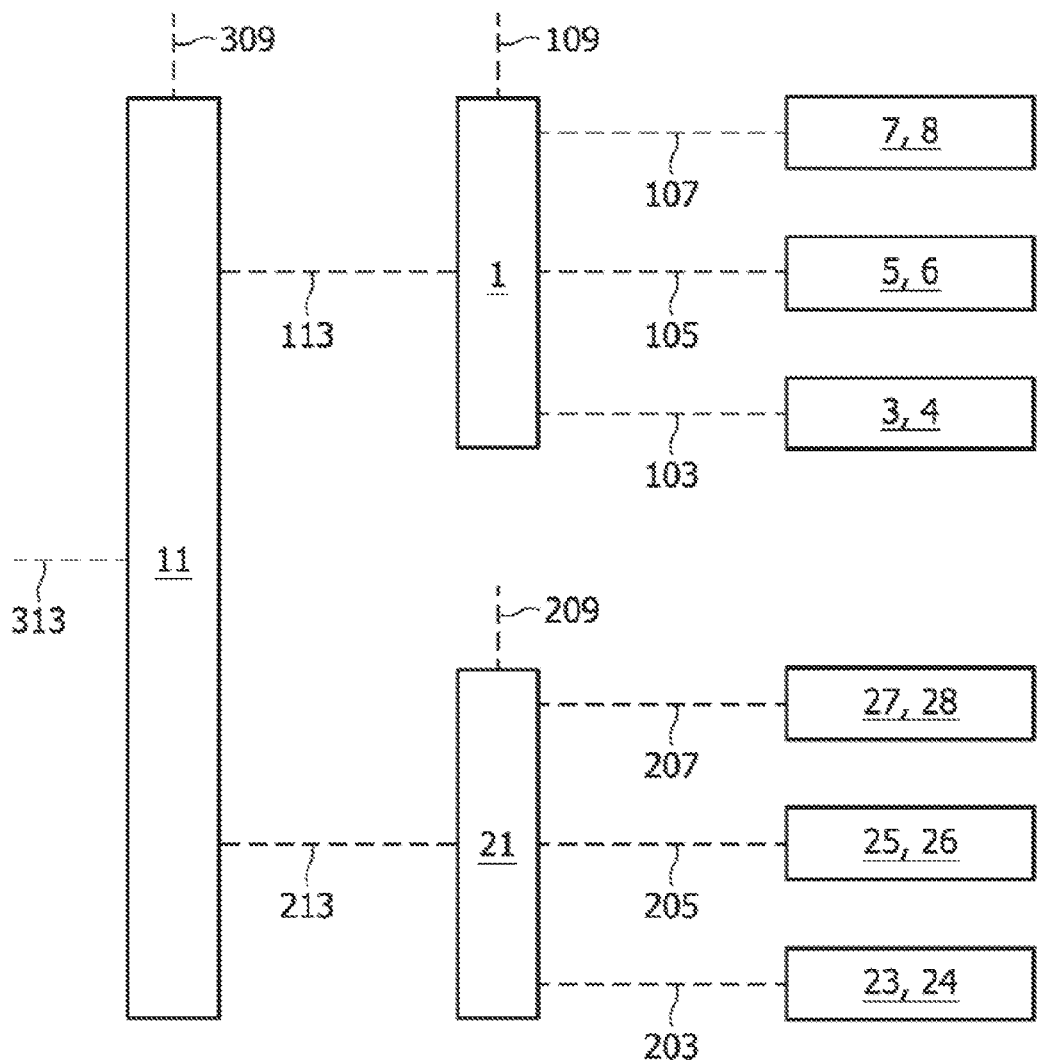
FIG. 2 shows a further device controlling two devices.

FIG. 2 shows a further device 11 for controlling the power consumption of the device 1 via a wireless or a non-wireless link 113 and for controlling the power consumption of another device 21 similar to the device 1 via a wireless or a non-wireless link 213. The device 1, as already described with reference to FIG. 1, controls the power consumption of the three receiving units 3, 5 and 7 via the links 103, 105 and 107. For the sake of clarity, the three receiving units 3, 5 and 7 are here indicated in combination with the three apparatuses 4, 6 and 8, while the transmitting unit 2 and the detector 9 have been omitted; only the link 109 is shown. Similarly to the device 1, the device 21 controls the power consumption of three receiving units 23, 25 and 27 via the links 203, 205 and 207. For the sake of clarity, the three receiving units 23, 25 and 27 are here indicated in combination with three apparatuses 24, 26 and 28, while a transmitting unit similar to the transmitting unit 2 and a detector similar to the detector 9 have been omitted; only a link 209 is shown. The power consumption of the further device 11 may be controlled via a wireless or a non-wireless link 313.

In a minimum situation, the device 1 (21) will control the power consumption of one receiving unit 3 (5, 7) and the further device 11 will control the power consumption of one device 1 (21). In a more common situation, the device 1 (21) will control the power consumption of more than one receiving unit 3 (5, 7) and the further device 11 will control the power consumption of more than one device 1 (21).

Figure 3:
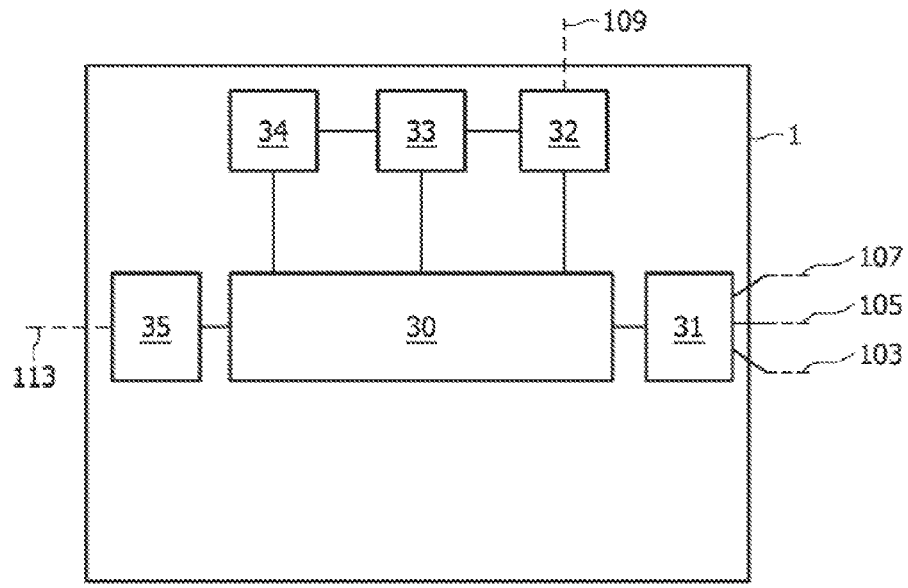
FIG. 3 shows a first embodiment of a device.

FIG. 3 shows a first embodiment of a device 1. The device 1 comprises a controller 30 for controlling the power consumption of the receiving units 3, 5 and 7 via an interface 31 and the links 103, 105 and 107 in response to a detection of states of the apparatuses 4, 6 and 8. To this end, the device 1 further comprises, for example, an interface 32 for interfacing the link 109. The device 1 also comprises, for example, a monitor 33 for monitoring the power consumption of, and/or a current flowing through, and/or a voltage supplied to the receiving units 3, 5 and 7 and/or the apparatuses 4, 6 and 8 so as to derive information about the states of the apparatuses 4, 6 and 8. Alternatively, the monitor 33 may be integrated in the detector 9, or the detector 9 may be integrated in the monitor 33. The device 1 further comprises, for example, a processor 34 which, in response to an analysis of the power consumption of, and/or a current flowing through, and/or a voltage supplied to the receiving units 3, 5 and 7 and/or the apparatuses 4, 6 and 8, generates statistics and/or a message, and/or adapts a behavior of the device 1. Such an analysis may be performed by the processor 34 or may be performed outside the device 1. Furthermore, the device 1 comprises, for example, an interface 35 for interfacing the link 113.

The interface 31 may be a wireless or a non-wireless interface 31 for controlling the power consumption of the receiving units 3, 5 and 7 in a wireless or non-wireless manner. The interface 31 may be a physical and/or a logical interface 31 for controlling the power consumption of the receiving units 3, 5 and 7 physically (through switching) and/or logically (through commanding).

Figure 4:
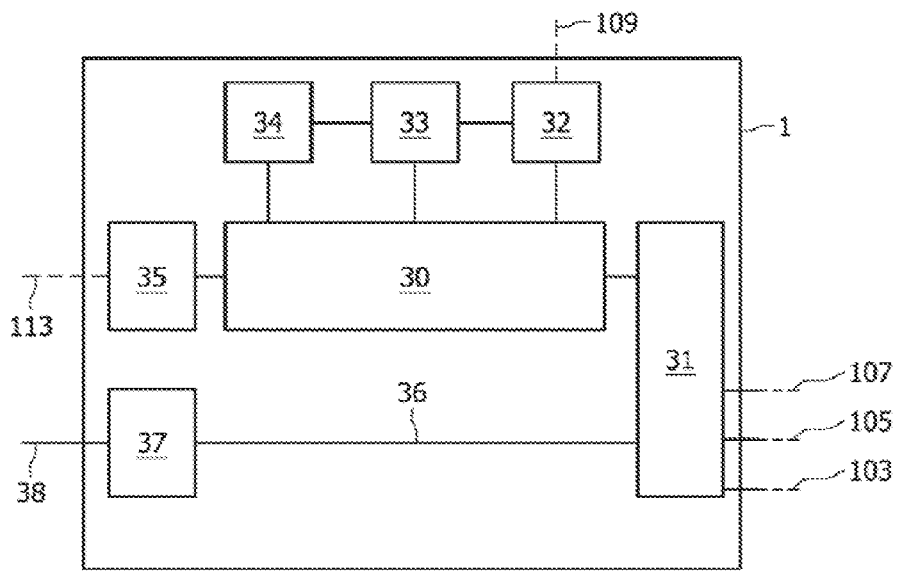
FIG. 4 shows a second embodiment of a device.

FIG. 4 shows a second embodiment of a device 1. This device 1 differs from the one shown in FIG. 3 in that, in this case, the device 1 further comprises an interface 37 for interfacing a supply line 38. The supply line 38 supplies power to the device 1, and the interface 37 is coupled to the interface 31 via a supply line 36. In this case, the interface 31 is a non-wireless and physical interface 31 and, dependent on the detection results, either passes or does not pass the power via the non-wireless links 103, 105 and 107 to the receiving units 3, 5 and 7.

Figure 5:
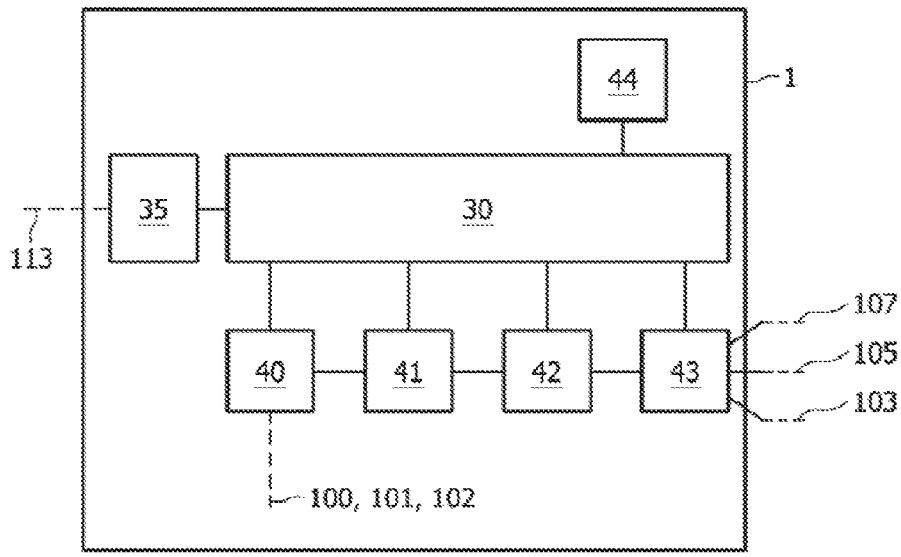
FIG. 5 shows a third embodiment of a device.

FIG. 5 shows a third embodiment of a device 1. This device 1 comprises the controller 30 and the interface 35 already described hereinbefore with reference to FIG. 3. This device 1 further comprises a receiver 40 for receiving the operation control signals exchanged (usually in a wireless or otherwise non-wireless manner) between the transmitting unit 2 and the receiving units 3, 5 and 7. The device 1 may further comprise a detector 41 for detecting the state of the apparatuses 4, 6 and 8 in response to a reception of these operation control signals. This detector 41 may act in addition to the detector 9 shown in FIG. 1 or it may act instead of this detector 9. The device 1 may further comprise a converter 42 for converting the operation control signals into converted signals, and/or the device 1 may further comprise a transmitter 43 for transmitting the operation control signals or the converted signals to the receiving units 3, 5 and 7. The device 1 may further comprise a memory 44 for storing the operation control signals and/or the converted signals. The operation control signals and/or converted signals may be transmitted immediately after reception and/or conversion, or after expiration or termination of a time interval, or after having ensured that the receiving unit 3, 5, 7 is powered and/or is capable of receiving these operation control signals and/or converted signals. The transmission of the operation control signals and/or converted signals may comprise a single transmission, a single re-transmission and/or repeated (re-)transmissions, etc. The controller 30 preferably communicates via the transmitter 43 for controlling the power consumption of the receiving units 3, 5 and 7 via the converted signals. The device 1 may be further provided with a processor which, in response to an analysis of traffic exchanged via each receiving unit 3, 5 and 7, for example, between the transmitting unit 2 and each receiving unit 3, 5 and 7, generates statistics and/or a message, and/or adapts a behavior of the device 1. Such an analysis may be performed by the processor or may be performed outside the device 1.

When an apparatus 4 (6, 8) is switched on or off or is in another state, its receiving unit 3 (5, 7) may be switched off by the device 1 so as to reduce energy consumption, either under the condition that the device 1 knows how long this receiving unit 3 (5, 7) may remain switched off, or under the condition that the device 1 has access to the information exchanged between the transmitting unit 2 and the receiving unit 3 (5, 7), such that the device 1 can react to new information exchanged between the transmitting unit 2 and the receiving unit 3 (5, 7), such as a new operation control signal, and then switch the receiving unit 3 (5, 7) back on.

Figure 6:
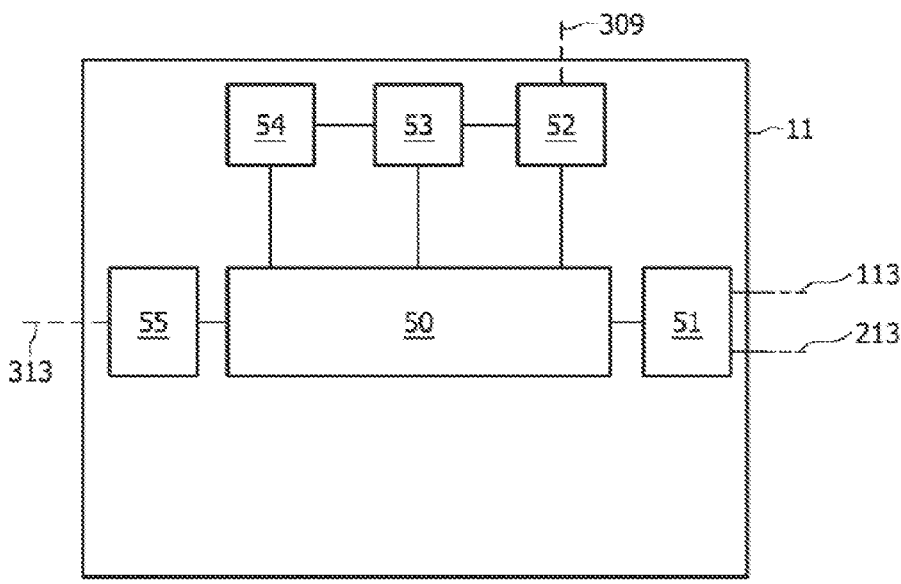
FIG. 6 shows a first embodiment of a further device.

FIG. 6 shows a first embodiment of a further device 11. The further device 11 comprises a controller 50 for controlling the power consumption of the devices 1 and 21 via an interface 51 and the links 113 and 213 in response to a detection of states of the devices 1 and 21 and/or the receiving units 3, 5 and 7 and/or the apparatuses 4, 6 and 8. To this end, the further device 11 also comprises, for example, an interface 52 for interfacing the link 309. This link 309 may correspond to the link 109 or it may be a different link for linking the devices 1 and 21 with the further device 11. The further device 11 also comprises, for example, a monitor 53 for monitoring the power consumption of, and/or a current flowing through, and/or a voltage supplied to the devices 1 and 21 and/or the receiving units 3, 5 and 7 and/or the apparatuses 4, 6 and 8 so as to derive information about the states of the devices 1 and 21 and/or the receiving units 3, 5 and 7 and/or the apparatuses 4, 6 and 8. Alternatively, the monitor 53 may be integrated in the detector 9, or the detector 9 may be integrated in the monitor 53. The further device 11 also comprises, for example, a processor 54 which, in response to an analysis of the power consumption of, and/or a current flowing through, and/or a voltage supplied to the devices 1 and 21 and/or the receiving units 3, 5 and 7 and/or the apparatuses 4, 6 and 8, generates statistics and/or a message, and/or adapts a behavior of the further device 11. Such an analysis may be performed by the processor 54 or may be performed outside the further device 11. The further device 11 also comprises, for example, an interface 55 for interfacing a link 313.

The interface 51 may be a wireless or a non-wireless interface 51 for controlling the power consumption of the devices 1 and 21 in a wireless or non-wireless manner. The interface 51 may be a physical and/or a logical interface 51 for controlling the power consumption of the devices 1 and 21 physically (through switching) and/or logically (through commanding).

Figure 7:
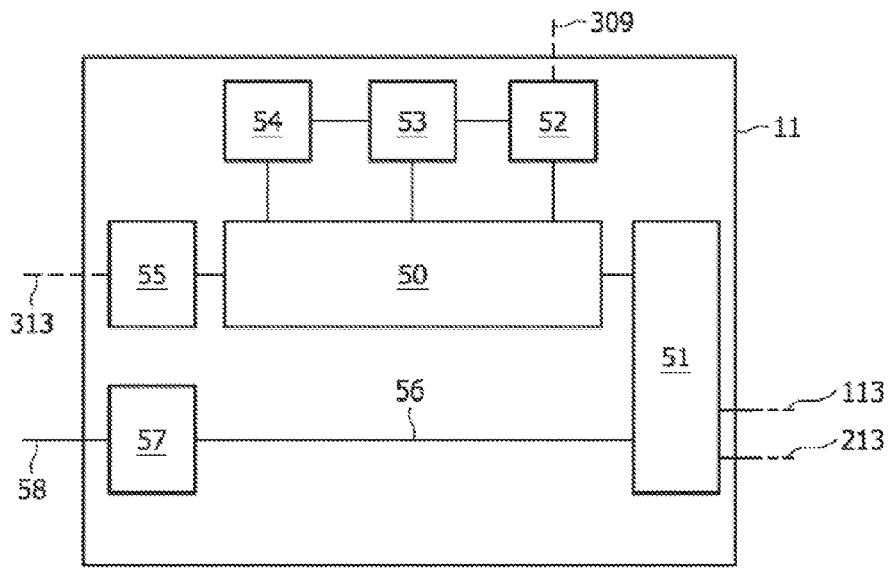
FIG. 7 shows a second embodiment of a further device.

FIG. 7 shows a second embodiment of a further device 11. This further device 11 differs from the one shown in FIG. 6 in that, in this case, the further device 11 also comprises an interface 57 for interfacing a supply line 58. The supply line 58 supplies power to the further device 11, and the interface 57 is coupled to the interface 51 via a supply line 56. In this case, the interface 51 is a non-wireless and physical interface 51 and, dependent on the detection results, either passes or does not pass the power via the non-wireless links 113 and 213 to the devices 1 and 21.

Figure 8:
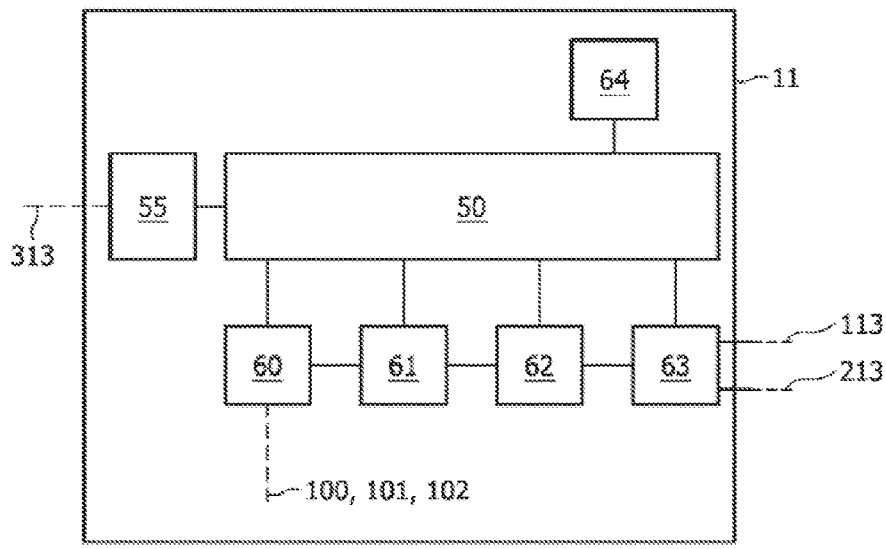
FIG. 8 shows a third embodiment of a further device.

FIG. 8 shows a third embodiment of a further device 11. This further device 11 comprises the controller 50 and the interface 55 already described hereinbefore with reference to FIG. 6. This further device 11 also comprises a receiver 60 for receiving the operation control signals exchanged (usually in a wireless or otherwise non-wireless manner) between the transmitting unit 2 and the receiving units 3, 5 and 7. The further device 11 may also comprise a detector 61 for detecting the state of the apparatuses 4, 6 and 8 in response to a reception of these operation control signals. This detector 61 may act in addition to the detector 9 shown in FIG. 1 or it may act instead of this detector 9. The detector 61 may act in addition to the detector 41 shown in FIG. 5 or it may act instead of this detector 41. The further device 11 may also comprise a converter 62 for converting the operation control signals into converted signals, and/or it may also comprise a transmitter 63 for transmitting the operation control signals or the converted signals to the devices 1 and 21 or to the receiving units 3, 5 and 7, possibly via the devices 1 and 21. The further device 11 may also comprise a memory 64 for storing the operation control signals and/or the converted signals. The operation control signals and/or converted signals may be transmitted immediately after reception and/or conversion or after expiration or termination of a time interval, or after having ensured that the device 1, 21 and/or the receiving unit 3, 5, 7 is powered and/or is capable of receiving these operation control signals and/or converted signals. The transmission of the operation control signals and/or converted signals may comprise a single transmission, a single re-transmission and/or repeated (re-)transmissions, etc. The controller 50 preferably communicates via the transmitter 63 for controlling the power consumption of the devices 1 and 21 via the converted signals. The further device 11 may also be provided with a processor which, in response to an analysis of traffic exchanged via each receiving unit 3, 5 and 7, for example, between the transmitting unit 2 and each receiving unit 3, 5 and 7, generates statistics and/or a message, and/or adapts a behavior of the further device 11 and/or the devices 1 and 21. Such an analysis may be performed by the processor or may be performed outside the further device 11.

When an apparatus 4 (6, 8) is switched on or off or is in another state, and/or when its receiving unit 3 (5, 7) is switched on or off or is in another state, and/or when its device 1 is switched on or is in another state, this device 1 may be switched off by the further device 11 so as to reduce energy consumption, either under the condition that the further device 11 knows how long this device 1 may remain switched off, or under the condition that the further device 11 has access to the information exchanged between the transmitting unit 2 and the receiving unit 3 (5, 7), such that the further device 11 can react to new information exchanged between the transmitting unit 2 and the receiving unit 3 (5, 7), such as a new operation control signal, and then switch the device 1 back on.

When a system comprises, for example, a further device per floor of a building for floor control and, per floor, a device per room for room control, the power is distributed on the floor-to-room level and finally to the apparatuses. These apparatuses comprise, for example, light units coupled to receiving units with integrated ZigBee ballasts. All equipment communicates, for example, via ZigBee interfaces. Each device may store a list of identifiers (e.g. ZigBee 16-bit addresses) of light units whose power supply is controlled by each device. The list of units controlled by each device may be pre-configured, e.g. using the ZigBee-NWK-layer DirectJoin mechanism and/or the ZigBee-APS-layer Binding mechanism, the ZigBee Group mechanism or any suitable application mechanism. In a preferred embodiment, the devices automatically learn about the units to which they supply power by simultaneously analyzing the ZigBee control traffic and the resulting current consumption on the supply lines. In this learning phase, the devices just monitor the power consumption without switching off the power supply. Thus, detection of operational/stand-by power consumption and/or detection of power line topologies other than one supply line+power switch/transmitting unit per light unit is also possible.

The devices themselves may always stay on by default so as to be able to monitor the ZigBee control traffic. If a light unit is switched off, the device switches off the power supply to that unit. When a control message is now sent via ZigBee to one of the light units (that is currently powered down) of the device, the device supplies the power to this unit again.

The role of the device may be hidden to the other components. The transmitting unit may be configured to send the control messages directly to the controlled receiving units via ZigBee. The device simply acts as a ZigBee "sniffer", eavesdropping on messages being sent directly to the units and concluding from the control traffic and the power consumption whether to turn on/off the power supply of a particular light unit.

To limit power consumption by the device itself, the device preferably only needs to enable its radio after one of its light units has been switched off. While all light units are on and powered, the controller may rely solely on the analysis of the power consumption (until standby power consumption is detected for a particular light unit).

The device may act as a proxy. It may receive the traffic from the transmitting unit and forward the traffic to the light units after having ensured that they are powered. In that case, the traffic may need to be stored, for example, temporarily.

This functionality can be made explicit if the device is hosting the LON-style controller Application Object. It can also be realized implicitly if the light units as well as the receiving units controlling them are configured as ZED-children of the device being a ZigBee router.

To ensure optimum performance, the messages to ZigBee light units preferably need to be "proxied" by the device only when the light units are off, and can be directly received by the light units when they are on.

The device may act as intelligent proxy towards the light units. It may be configured with additional logic components so as to analyze the control command that has just been received from a transmitting unit and decide whether to power the light unit back on. This may help to limit both the power consumption and the amount of ZigBee control traffic, e.g. in the case of noisy or broken (light) sensors.

In this way, only the devices need to be powered. All other ZigBee nodes get totally switched off during idle time and do not consume any power.

The devices can create a physical or a logical power supply hierarchy. In the physical power supply hierarchy, the devices physically cut off the power supplied to the units controlled by them (the light units or another level of devices, if used), e.g. by using relays. In the logical power supply hierarchy, the devices only forward power-ON/power-OFF commands to the units controlled by them.

After all light units of one device have been controlled into standby, the device itself goes to standby and the further device which is the next higher in hierarchy can switch it off. Several power supply hierarchy levels may be supported.

The ON commands from the transmitting units in each room are to be received by the further device controlling the floor, so that it can receive them and power up the appropriate device controlling the room, as well as power up the appropriate light units. The further device controlling the floor may need to store the information about which transmitting unit controls the light units of which device. This information may be collected by the further device or may be learned, etc.

The devices do not need to get their commands via ZigBee but may get them through a wired connection (e.g. Ethernet) and have a ZigBee control node that translates the wired commands into ZigBee commands.

The device may learn about the normal power consumption of the connected light units and generate diagnostic messages or signals whenever the power consumption changes drastically, which might be an indication of broken or defective light sources. This message may also be issued if a prerecorded behavior such as a start-up time of a lamp such as a HID lamp changes beyond a threshold, or when a lamp needs multiple starts to burn, etc. indicating that the lamp needs to be exchanged soon.

The same mechanism may also be used for other types of appliances, and different wireless and non-wireless technologies may be used. The ZigBee technology is thus an example only, and alternative technologies are not to be excluded.

Each interface may be a simple connection or coupling, a more complex passive or active converter, or a high-complex interface comprising its own processor. Each controller may be a simple non-programmable controller, a more complex programmable controller, or a high-complex controller with learning capabilities. Each detector and monitor may be a simple comparator, a more complex filter/calculator, or a high-complex analyzer.

In summary, an average power consumption of receiving units 3,5,7 for controlling apparatuses 4,6,8 in response to operation control signals from transmitting units 2 may be reduced by introducing devices 1,21 for controlling the power consumption of the receiving units 3,5,7 in response to detections of states of the apparatuses 4,6,8. The devices 1 may comprise controllers 30 for controlling the power consumption in a wireless, non-wireless, physical and/or logical manner. The devices 1 may comprise monitors 33 for monitoring power consumption, currents and/or voltages at the receiving units 3,5,7 and/or the apparatuses 4,6,8. The devices 1 may comprise receivers 40, detectors 41, converters 42 and transmitters 43 for receiving the operation control signals, detecting the states of the apparatuses 4,6,8, converting the operation control signals into converted signals, and transmitting the operation control signals or the converted signals to the receiving units 3,5,7 for controlling the power consumption of the receiving units 3,5,7 via the transmitted signals, wherein the transmitted signals correspond to power control signals.

While the invention has been illustrated and described in detail in the drawings and the foregoing description, such an illustration and description are to be considered illustrative or as examples which are not restrictive; the invention is not limited to the disclosed embodiments. For example, it is possible to operate the invention in an embodiment wherein different parts of the different disclosed embodiments are combined to a new embodiment.

Other variants of the disclosed embodiments can be understood and effected by those skilled in the art in practicing the claimed invention, from a study of the drawings, the disclosure, and the appended claims. In the claims, use of the verb "comprise" and its conjugations does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device for controlling a power consumption of a receiving unit, the receiving unit being arranged to control an apparatus in response to a reception of a wireless or non-wireless operation control signal from a transmitting unit, the apparatus comprising a product that is remotely controlled via a combination of the transmitting unit and the receiving unit, the device comprising:
   a controller for, in response to a detection of a state of the apparatus, controlling the power consumption of the receiving unit for reducing an average power consumption of the receiving unit;
   a receiver for receiving the operation control signal, the device being configured to switch the receiving unit off when the apparatus is switched on or off or is in another state and to switch the receiving unit back on in reaction to a reception of the operation control signal; and
   a processor for, in response to an analysis of traffic exchanged between the transmitting unit and the receiving unit, generating statistics and generating a message.

2. The device as defined in claim 1, the device being arranged to control a power consumption of a further receiving unit, the further receiving unit being arranged to control a further apparatus, the controller being arranged to, in response to a detection of a state of the further apparatus, control the power consumption of the further receiving unit for reducing an average power consumption of the further receiving unit.

3. The device as defined in claim 1, the receiving unit forming part of a lamp driver, and/or the apparatus comprising a lamp.

4. The device as defined in claim 1, the controller communicating via a wireless or non-wireless interface for controlling the power consumption of the receiving unit wirelessly or non-wirelessly, and/or the controller communicating via a physical and/or logical interface for controlling the power consumption of the receiving unit physically and/or logically.

5. The device as defined in claim 1, the device further comprising a monitor for monitoring a power consumption of and/or a current flowing through and/or a voltage supplied to the receiving unit and/or the apparatus.

6. The device as defined in claim 1, the device further comprising a detector for detecting the state of the apparatus in response to a reception of the operation control signal.

7. The device as defined in claim 1, the device further comprising a memory for storing at least the operation control signal, and a transmitter for transmitting and/or re-transmitting at least the operation control signal to the receiving unit.

8. The device as defined in claim 1, the device further comprising a converter for converting the operation control signal into a converted signal.

9. The device as defined in claim 7, the controller communicating via the transmitter for controlling the power consumption of the receiving unit via the converted signal.

10. The device of claim 1, wherein the device is configured to switch the receiving unit off when the apparatus is switched on and to switch the receiving unit back on in reaction to a reception of the operation control signal.

11. The device of claim 1, wherein the device comprises a wireless interface and wherein the device communicates a wireless signal to the receiving unit via the wireless interface to control the power consumption of the receiving unit by selectively turning the receiving unit on and off.

12. The device of claim 1, wherein the device receives power via a supply line and includes an interface which is configured under control of the controller to selectively pass the power to the receiving unit via a non-wireless interface between the device and the receiving unit to selectively turn the receiving unit on and off.

13. The device of claim 1, wherein the device includes a wireless interface for transmitting the received operation control signal to the receiving unit.

14. The device of claim 1, wherein the device is configured to switch the receiving unit on and off in response to the operation control signal received by the receiver of the device.

15. A device for controlling a power consumption of a plurality of receiving units, each receiving unit each being arranged to control a corresponding apparatus in response to reception of operation control signals transmitted from a transmitting unit to the receiving unit, the apparatus comprising a product that is remotely controlled via a combination of the transmitting unit and the receiving unit, the device comprising:
  a wireless receiver configured to sniff the operation control signals which are transmitted wirelessly from the transmitting unit directly to the receiving units and received by the receiving units directly from the transmitting unit;
  a detector configured to detect a state of each apparatus in response to the operation control signals sniffed by the wireless receiver;
  an interface to one or more links between the device and the receiving units; and
  a controller configured to, in response to a detection of a state of one of the apparatuses, control via the interface the power consumption of the corresponding receiving unit for reducing an average power consumption of the corresponding receiving unit, the device being configured to switch each receiving unit off when the corresponding apparatus is switched on or off or is in another state, and to switch the receiving unit back on in response to one of the operation control signals sniffed by the wireless receiver.

16. The device of claim 15, wherein the transmitting unit transmits the operation control signals directly to the receiving unit according to a Zigbee protocol, and wherein the receiver comprises a Zigbee receiver configured to sniff the operation control signals which are transmitted according to the Zigbee protocol.

17. The device of claim 15, further comprising an interface configured to receive a further control signal from a further device, the further control signal being configured for reducing an average power consumption of the device.

18. A system including a device for controlling a power consumption of a plurality of receiving units, each receiving unit each being arranged to control a corresponding apparatus in response to reception of operation control signals transmitted from a transmitting unit to the receiving unit, the apparatus comprising a product that is remotely controlled via a combination of the transmitting unit and the receiving unit, the device comprising:
  a first interface connected to a detector via an information link and configured to receive from the detector via the information link data indicating a state of each of the apparatuses;
  an interface to one or more links between the device and the receiving units; and
  a controller configured to, in response to a detection of a state of one of the apparatuses from the data received via the first interface from the detector, control via the interface the power consumption of the corresponding receiving unit for reducing an average power consumption of the corresponding receiving unit, the device being configured to switch each receiving unit off when the corresponding apparatus is switched on or off or is in another state, and to switch the receiving unit back on in response to expiration of a predefined time interval.

19. The device of claim 18, wherein the device does not supply power to the receiving units, and is configured to control the power consumption of the receiving units by transmitting power control signals to the receiving units via the interface.

20. The device of claim 18, the device is configured to selectively supply and not supply power to each of the receiving units via the interface.

* * * * *